Sept. 18, 1962　　　H. Y. FISHER ET AL　　　3,054,935
FLEXIBLE LINK STRUCTURE
Filed March 18, 1959　　　　　　　　　　　　3 Sheets-Sheet 1
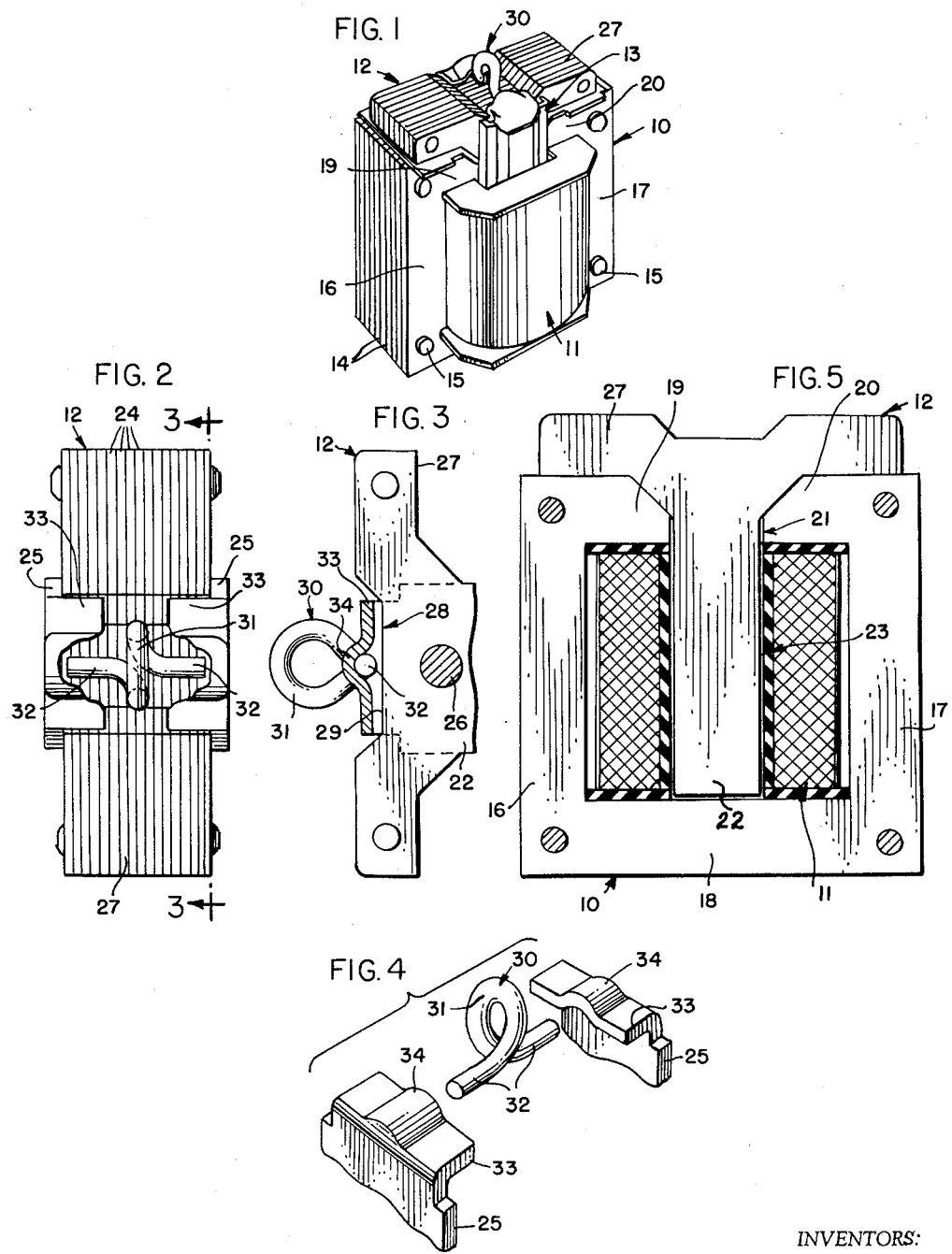
INVENTORS:
HARDIN Y. FISHER
HENRY H. MAMLOK
BY
ATT'YS Sept. 18, 1962 H. Y. FISHER ET AL 3,054,935
FLEXIBLE LINK STRUCTURE
Filed March 18, 1959 3 Sheets-Sheet 2
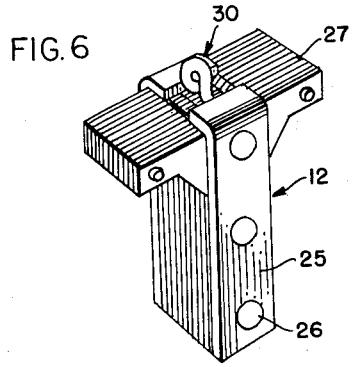
FIG. 6
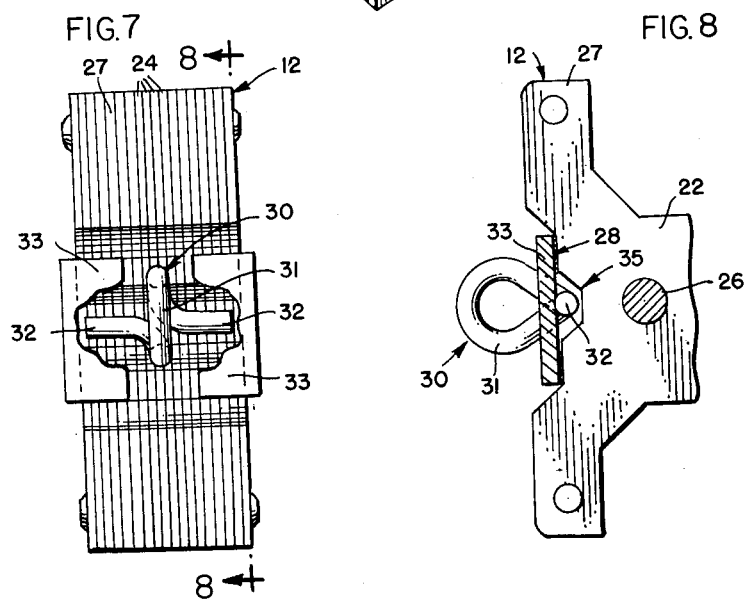
FIG. 7 FIG. 8
FIG. 9
INVENTORS:
HARDIN Y. FISHER
HENRY H. MAMLOK
BY Marzell Johnston,
Cobb & Root
ATT'YS

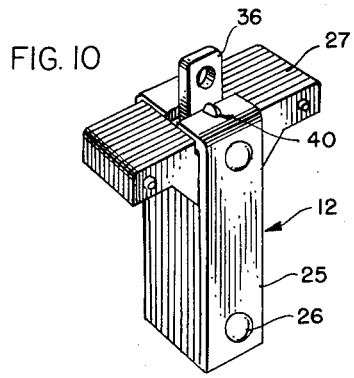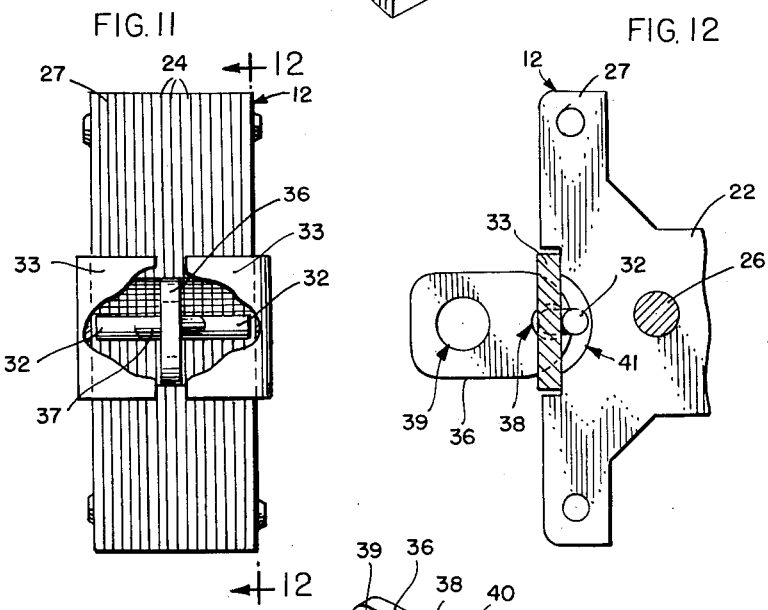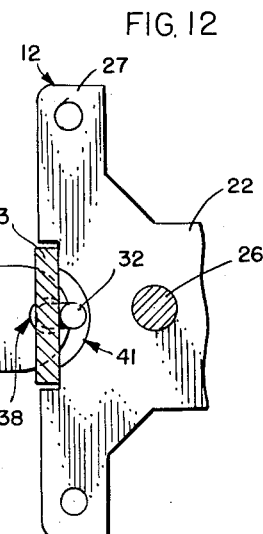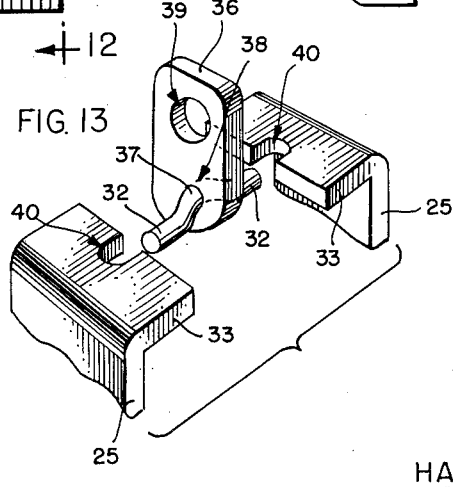

United States Patent Office 3,054,935
Patented Sept. 18, 1962

3,054,935
FLEXIBLE LINK STRUCTURE
Hardin Y. Fisher, Hillside, and Henry H. Mamlok, Skokie, Ill., assignors to Albert F. Dormeyer, Chicago, Ill.
Filed Mar. 18, 1959, Ser. No. 800,307
8 Claims. (Cl. 317—191)

This invention relates in general to solenoids, and more particularly to flexible link structures for the outer end of a plunger of a solenoid for connecting the plunger to the load to be actuated by the plunger and compensate for maladjustment therebetween.

Heretofore, solenoids generally have used a relatively rigid type construction for connecting the plunger to the load which required extremely accurate mounting of the solenoid in order to obtain proper operation. And even then when the solenoid became maladjusted relative to the load, the load force tended to cock the plunger angularly to one side thereby binding it in its slide and rendering it nonoperating. In solenoids having a plunger with a seating bar, improper seating would result from disalignment between the plunger axis and the load which would cause excessive friction between the plunger and the slides and wearing of the parts resulting in premature failure of the solenoid.

The flexible link structure of the present invention applied to a solenoid plunger includes load coupling means carried by pintles which are bearingly mounted on the outer free end of the plunger by bearing straps integral with the pull bars, whereby the usual undesirable effects of maladjustment between the plunger axis and the load will be minimized, if not completely eliminated.

Accordingly, it is an object of this invention to provide an improved flexible link structure for solenoids.

Another object of this invention resides in the provision of a flexible link structure for the plunger of a solenoid, wherein the link structure is connected to the load and serves to accommodate maladjustment between the plunger and the load.

Still another object of this invention is in the provision of a flexible link structure for a solenoid plunger which is extremely simple in construction and may be inexpensively manufactured.

A further object of this invention is to provide a flexible link structure for plunger solenoids, wherein the pull bars of the plunger which overlie the outer laminae are utilized to bearingly mount the link structure thereby providing an economically constructed link structure for plunger solenoids capable of accommodating maladjustment between the plunger and the load.

A further object of this invention is to provide a flexible link structure for solenoid plungers wherein the structure includes integral link and pintles pivotally and bearingly mounted at the outer end of a plunger.

Other objects, features, and advantages of the invention will be apparent from the following detailed disclosure, taken in conjunction with the accompanying sheets of drawings, wherein like reference numerals refer to like parts, in which:

FIG. 1 is a perspective view of a solenoid embodying the flexible link structure of the present invention;

FIG. 2 is a top plan view of the solenoid of FIG. 1, with certain parts broken away to show underlying parts;

FIG. 3 is a fragmentary detail sectional view, taken substantially along line 3—3 of FIG. 2 and illustrating some parts in elevation;

FIG. 4 is an exploded view, partially fragmentary, of the flexible link structure of FIGS. 1 to 3;

FIG. 5 is a somewhat diagrammatic transverse sectional view, taken through the solenoid of the present invention;

FIG. 6 is a perspective view of a plunger illustrating an embodiment of the invention;

FIG. 7 is a top plan view of the embodiment of FIG. 6, with some parts broken away to show underlying parts;

FIG. 8 is a transverse sectional view, taken substantially along line 8—8 of FIG. 7, and showing some parts in elevation;

FIG. 9 is an exploded view, partially fragmentary, of the flexible link structure of FIGS. 6 to 8;

FIG. 10 is a perspective view of a solenoid plunger illustrating another embodiment of the invention;

FIG. 11 is a top plan view of the embodiment of FIG. 10, with some parts broken away to show underlying parts;

FIG. 12 is a sectional view, taken substantially along line 12—12 of FIG. 11, and showing some parts in elevation; and FIG. 13 is an exploded view, partially fragmentary, of the flexible link structure of FIGS. 10 to 12.

To illustrate the invention, the drawings show a solenoid including a generally C-shaped magnetically permeable frame 10, a hollow coil 11 embraced by the frame, a plunger 12 slidably received in the frame and the hollow coil. A slide structure 13 including a pair of plunger slides receive and guide the reciprocal movement of the plunger.

The frame 10 is constructed in the usual manner by securing together a plurality of identically formed laminae 14 by means of a plurality of rivets or fasteners 15, FIG. 1. Referring now particularly to FIG. 5, the C-shaped frame 10 includes parallel spaced legs 16 and 17 straddling the coil 11, and being connected together at adjacent ends by the bight 18 of the frame. At the other ends of the legs, inwardly extending projections 19 and 20, having substantially the same cross-section as the legs of the frame, define therebetween an air gap or opening 21 through which the plunger stem 22 passes. The plunger stem is also received in the hollow 23 of the coil 11.

The plunger 12 is similarly constructed from a magnetically permeable material, and from a plurality of substantially identically shaped laminae 24, FIG. 2. Pull bars 25 are arranged over the opposite sides of the outermost laminae 24, wherein the pull bars are at the sides of the plunger. Fasteners or rivets 26 secure the pull bars and laminae together. The particular plunger herein illustrated is also provided with a seating bar 27 extending substantially perpendicular to the stem 22 and at the outer free end of the plunger. The seating bar is recessed at 28, FIG. 3, which is at the outer end of the plunger stem 22 and it defines at this point a flat surface or face 29. The outer end of the seating bar 27 extends over the frame projections 19 and 20 and seat thereon as seen in FIGS. 1 and 5. The pull bars 25 generally constitute that part of the plunger which is slidably received by the slide structure 13.

In order to connect loads to the plunger of the present invention, a flexible link 30 including a loop or eye 31 and opposed pintles 32 is provided and bearingly mounted at the outer end of the plunger. The loop 31 is arranged in a plane extending longitudinally of the plunger seating bar 27 and normal to the outer flat surface 29, while the pintles 32 are in axial alignment and extend transverse to the longitudinal axis of the seating bar 27. Moreover, the axes of the pintles 32 are generally arranged along a central plane extending longitudinally through the plunger stem 22. The pintles 32 and the loop 31 are integrally formed from a single piece of material such as small bar stock, and the cross-section may be of any desirable configuration. Preferably, the pintles should be cylindrically shaped for the best possible operation.

The pintles 32 are pivotally held in place by bearing members or straps 33, FIG. 2, which are integral with the pull bars 25. Therefore, they may be formed by slightly extending the length of the pull bars 25 and bending over the upper free ends thereof so that the bearing straps 33 extend substantially normal to the pull bars 25.

Pintle bearing sockets 34 are formed in the bearing straps 33. These sockets are substantially semi-circular in shape and arranged centrally of the bearing straps 33. Thus, the sockets 34 coact with the outer flat surface 29 of the plunger stem to bearingly mount the pintles 32 of the flexible link 30 at the outer free end of the plunger. As seen in FIG. 3, the bearing straps 33 are slightly spaced from the outer flat face 29 of the plunger stem in order to accommodate a certain amount of clearance between the pintles 32 and outer flat surface 29 so that the pintles have relatively free and somewhat universal movement. However, this spacing between the bearing straps 33 and the outer flat surface 29 is not such as to allow movement of the pintles therebetween to the extent that the loop may be removed from the plunger. Therefore it may be seen that the flexible link 31 provides a pivotally mounted member for accommodating maladjustment between the plunger and its load which will ultimately enhance the life of any solenoid.

The embodiment of FIGS. 6, 7, 8 and 9 is substantially identical to that in FIGS. 1 to 5, with the exception of the shape of the bearing straps 33 and the elimination of a complete flat surface at the outer end of the plunger stem 22. Accordingly, similar parts will carry similar reference numerals. In this embodiment, the bearing straps 33 differ from the first embodiment in that they do not have the pintle sockets 34. Thus, the bearing straps 33 are completely flat throughout their entire length. Moreover, a pintle groove 35 is provided in the recess 28 of the plunger. This pintle groove may be of any desirable configuration and it extends transverse to the longitudinal axis of the plunger stem and the seating bar 27. The pintle groove serves to freely receive the pintle 32 of the flexible link 30, and the flat bearing straps 33 retain or lock the pintles in the groove and properly mounted at the end of the plunger stem. It may be noted in FIG. 8 that the pintle groove is deep enough in order to provide free movement in several directions of the pintles 32.

It is a simple matter when assembling the plunger stems by placing together the laminae and then the pull bars, to include the arranging of a flexible link 30 in position before securing the laminae and pull bars together.

Another embodiment of the invention is illustrated in FIGS. 10 to 13 which differs from the other embodiments, wherein a flat link 36 is pivotally carried by an upwardly bent portion 37 integral with the pintles 32. An aperture or hole 38 is provided in the lower end of the link 36 of a size slightly larger than the diameter of the bent portion 37 so that the link is freely received thereon. The outer end of the link 36 is provided with an aperture or hole 39 for connection of the link and plunger to the load. In order to maintain the bent portion 37 in a generally upstanding position at all times, opposed notches 40 are provided in the bearing straps 33 to freely receive the opposing sides of the upwardly bent portion. The outer end of the plunger is transversely notched or grooved at 41, FIG. 12, to define with the bearing straps 33 particircular openings for freely receiving the pintles 33.

It will be understood that modifications and variations may be effected without departing from the scope of the novel concepts of the present invention, but it is understood that this application is to be limited only by the scope of the appended claims.

The invention is claimed as follows:

1. A flexible link for a plunger of a solenoid, wherein the plunger includes a pair of opposed pull bars adapted to coact with sides to guide the reciprocal movement of the plunger, said link comprising an apertured portion projecting from the free end of the plunger, opposed pintles carried by said apertured portion, and bearing straps secured to the plunger at the free end thereof coacting with the outer end of the plunger for bearingly mounting said pintles thereon.

2. A flexible link for a plunger of a solenoid, wherein the plunger includes a pair of opposed pull bars adapted to coact with slides to guide the reciprocal movement of the plunger, said link comprising an apertured portion projecting from the free end of the plunger, opposed pintles carried by said apertured portion, and bearing straps secured to the plunger at the free end thereof coacting with the outer end of the plunger for bearingly mounting said pintles thereon, said bearing straps being integral with said pull bars.

3. A flexible link for a solenoid plunger, said plunger having a plurality of laminae stacked together and pull bars over the outer laminae, means securing said pull bars and laminae together, said pull bars adapted to coact with slides to guide the reciprocal movement of the plunger, the outer free end of said plunger including a substantially flat portion, said link comprising a loop projecting from said outer free end of said plunger, and opposed pintles carried by said loop arranged against said flat portion of said plunger, said loop movable in a plane extending parallel to the laminae and pull bars, and bearing straps carried by said pull bars coacting with the outer free end of the plunger for bearingly mounting said pintles and loop thereon.

4. A flexible link for a solenoid plunger, said plunger having a plurality of laminae stacked together and pull bars over the outer laminae, means securing said pull bars and laminae together, said pull bars adapted to coact with slides to guide the reciprocal movement of the plunger, the outer free end of said plunger including a substantially flat portion, said link comprising a loop projecting from said outer free end of said plunger, and opposed pintles carried by said loop arranged against said flat portion of said plunger, and bearing straps carried by said pull bars coacting with the outer free end of the plungers for bearingly mounting said pintles and loop thereon, said straps having pintle bearing sockets engaging said pintles.

5. A flexible link for a solenoid plunger, said plunger having a plurality of laminae stacked together and pull bars over the outer laminae, means securing said pull bars and laminae together, said pull bars adapted to coact with slides to guide the reciprocal movement of the plunger, the outer free end of said plunger having a pintle groove extending transverse said laminations, said link comprising a loop projecting from said outer free end of said plunger, and opposed pintles carried by said loop arranged in said pintle groove, and bearing straps carried by said pull bars coacting with the pintle groove of the plunger for bearingly mounting said pintles and loop thereon.

6. A solenoid comprising, a plunger, pull bars secured to opposite sides of said plunger, bearing straps integral with the outer ends of the pull bars and overlying the outer end of the plunger, opposed pintles between the straps and the plunger, and connecting means on said pintles for connecting the plunger to a load.

7. A solenoid comprising, a plunger, pull bars secured to opposite sides of said plunger, bearing straps integral with the outer ends of the pull bars and overlying the outer end of the plunger, a transverse groove in the outer end of the plunger coacting with the bearing straps to define opposed openings, opposed pintles received in said openings, and connecting means on said pintles for connecting the plunger to a load.

8. A solenoid comprising, a plunger, pull bars secured to opposite sides of said plunger, bearing straps integral with the outer ends of the pull bars and overlying the outer end of the plunger, a transverse groove in the outer end of the plunger coacting with the bearing straps to define opposed openings, opposed pintles received in said openings, an upwardly bent portion connected between said pintles, and a flat link pivotally carried on said bent portion.

References Cited in the file of this patent

UNITED STATES PATENTS

| | | |
|---|---|---|
| 653,397 | Pettijohn | July 10, 1900 |
| 2,158,480 | Peterson | May 16, 1939 |
| 2,682,625 | Soreng et al. | June 29, 1954 |